June 23, 1970  J. T. BERTVA ET AL  3,516,516
LUBRICATOR FOR AIR MOTORS
Filed Sept. 16, 1968  2 Sheets-Sheet 1

INVENTORS
JOHN T. BERTVA
GEORGE E. THRASHER, Jr
BY
Barnes, Kisselle, Raisch & Choate
ATTORNEYS

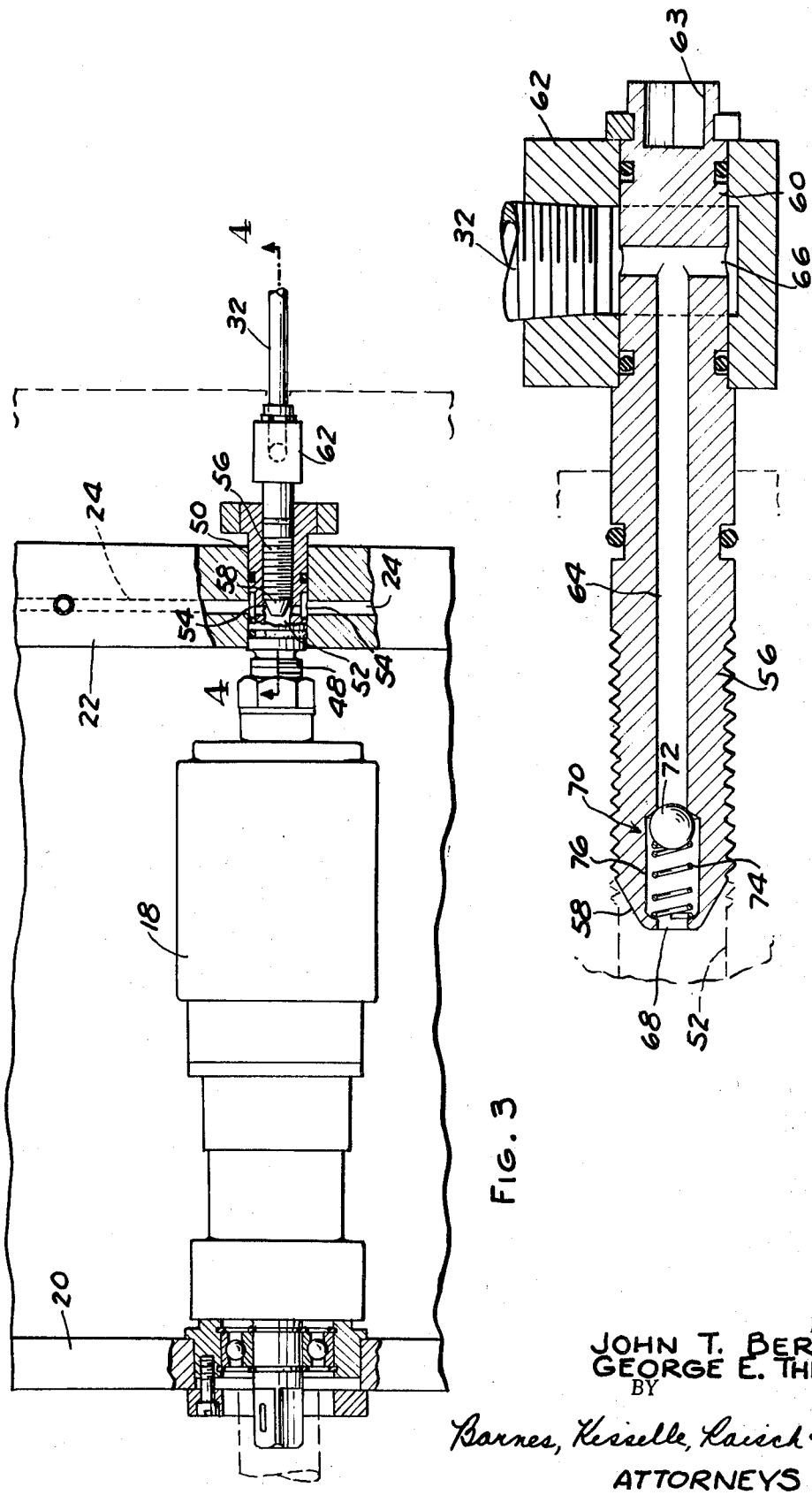

United States Patent Office 3,516,516
Patented June 23, 1970

3,516,516
LUBRICATOR FOR AIR MOTORS
John T. Bertva, Utica, and George E. Thrasher, Jr., Pontiac, Mich., assignors to Master Pheumatic-Detroit, Inc., Utica, Mich., a corporation of Michigan
Filed Sept. 16, 1968, Ser. No. 759,892
Int. Cl. F16n 7/30
U.S. Cl. 184—55                            5 Claims

ABSTRACT OF THE DISCLOSURE

A metering screw for metering the flow of air into an air motor has an inlet passageway for lubricant. When the lubricant is pressurized, it opens a check valve in the passageway, and the lubricant is injected into the region of metered air flow to the motor.

---

This invention relates to a lubricator by which lubricant is furnished to a motor which is powered by a flow of compressed air.

Conventional lubricating equipment for compressed air motors comprises a lubricant cup or reservoir mounted within the compressed air line upstream of the motor. As air passes through the line, it picks up lubricant from the reservoir and blows the lubricant downstream to the motor. For numerous reasons, these lubricators furnish unpredictable amounts of lubricant to the lubricated motor. In some instances, the motor receives inadequate lubricant; and in other instances, the motor is flooded with lubricant, both conditions being unacceptable in commercial or industrial use.

Even where these two extreme conditions do not exist, the delivery of lubricant at unpredictably varying rates is unacceptable in certain situations; for example, where the lubricated motor is required to produce a certain specified torque. Variations in the amount of lubricant furnished to such a motor result in departures from the specified torque. This problem is compounded where several such motors are furnished air from a common manifold, as in the case of a multiple spindle industrial screw-driving or nut-running head.

Those motors nearer the upstream portion of the manifold tend to receive more lubricant while those further downstream receive less, with the result that the motors exert different amounts of torque. Individual differences between the motors are conventionally controlled to a certain extent by providing individual metering screws by which the flow of air entering each individual motor is separately regulated. However, this does not take care of the non-uniform lubrication problem.

The object of the present invention is to provide a lubricator which is relatively simple and inexpensive and which is improved so that a predictable and accurately predetermined amount of lubricant is delivered to an air motor or to each of a number of air motors which are furnished air from a common manifold.

In general, the invention is carried out by providing a metering screw which meters the flow of compressed air to the motor. The metering screw has an internal passageway which is connected with a source of lubricant. The metering screw has an outlet port disposed within the region of metered air flow. When lubricant in the passageway is pressurized, it opens a check valve in the passageway to pass a predetermined quantity of lubricant directly into the region of metered air flow. The lubricant is pressurized by a pump which is actuated at predetermined intervals to inject the predetermined quantity of lubricant into the metered air stream. One form of the invention is shown in the accompanying drawings.

FIG. 3 is an enlarged scale sectional view on line 3—3 of FIG. 1.

FIG. 4 is a further enlarged scale sectional view on line 4—4 of FIG. 3.

Figure 1:
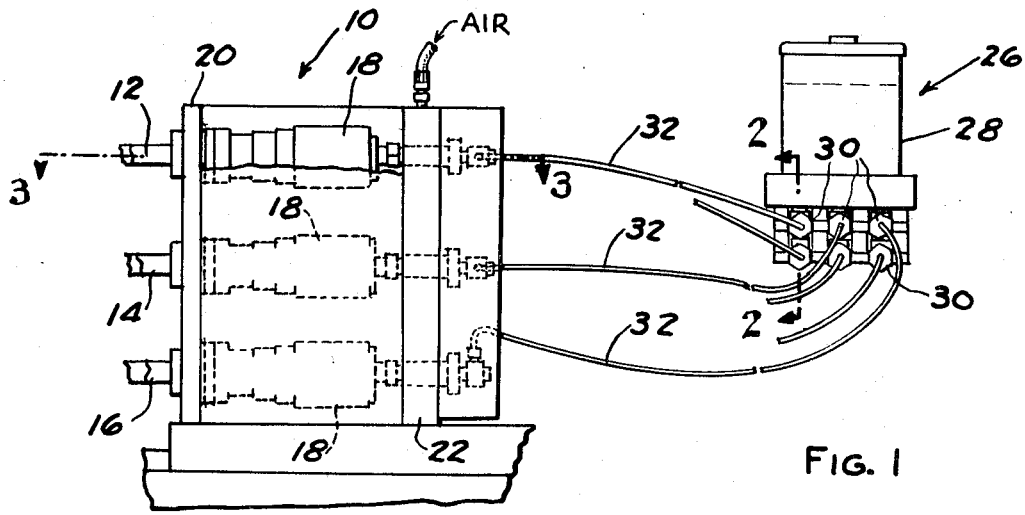
FIG. 1 is a partly diagrammatic elevational view of apparatus incorporating the present invention.

Shown in the drawings is a head 10 having multiple spindles 12, 14, 16, each driven by an air motor 18. The spindles may comprise nut runners, screwdrivers, or other tools. Each air motor is supported at one end on a plate 20 and is supported at its other end by a plate 22 having an internal air duct 24 forming a manifold which furnishes compressed air to each of the motors. The lubricating apparatus 26 includes a reservoir 28 from which lubricant is fed to a battery of pumps 30, each of which at predetermined intervals injects a predetermined quantity of lubricant into a line 32 through which lubricant is delivered to a motor 18. The structure and functioning of lubricating apparatus 26 is disclosed more fully in copending application Ser. No. 533,986 filed Mar. 14, 1966 and entitled "Industrial Lubricating System" which has issued as U.S. Pat. No. 3,421,600.

Figure 2:
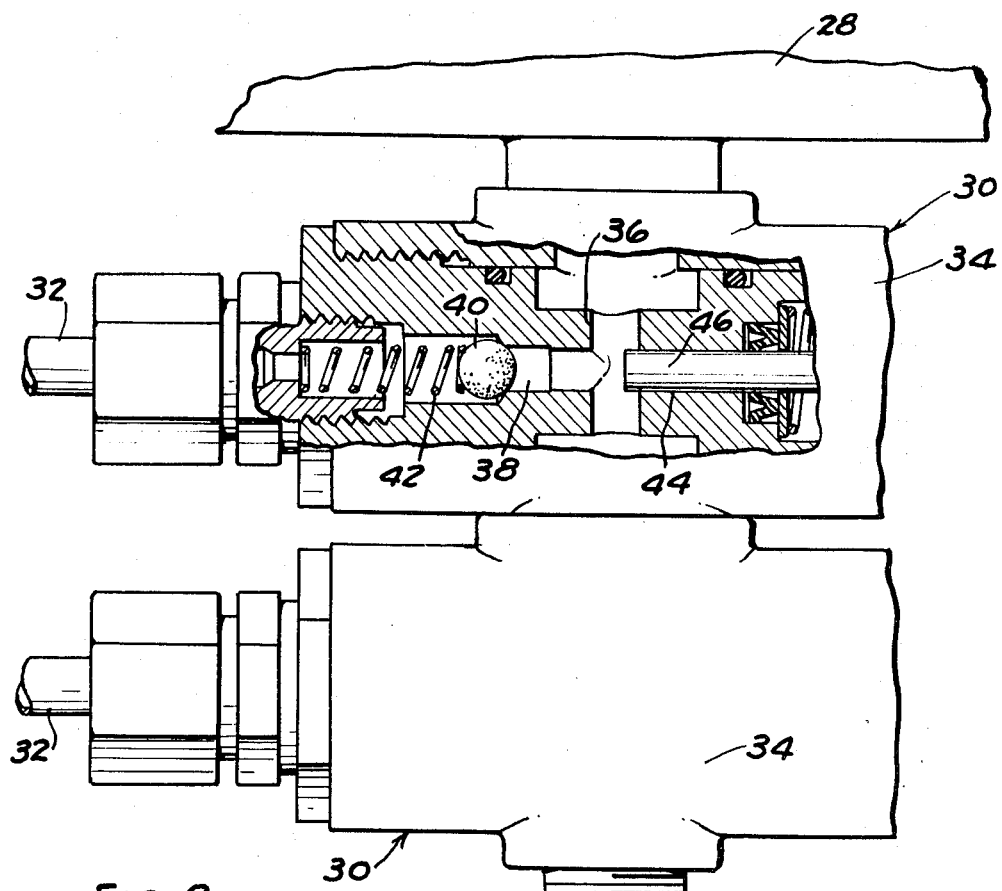
FIG. 2 is an enlarged scale partly sectional view on line 2—2 of FIG. 1.

Each pump has a body 34 with an inlet passageway 36 which receives lubricant from reservoir 28. A passageway 38 extends from passageway 36 into communication with lubricant line 32. A check valve member 40 within passageway 38 is biased toward closed condition by a compressed spring 42. Body 34 has an opening 44 in which a pump plunger 46 slides. When pump 30 is actuated, plunger 46 moves toward the left, as FIG. 2 is viewed, and enters passageway 38. This forces a predetermined quantity of lubricant past ball 40 and into lubricant line 32. The quantity of lubricant injected into line 32 is determined by the diameter of plunger 46 and passageway 38 and the extent to which the plunger penetrates passageway 38. When the pump is deactuated, plunger 46 returns to the position shown in FIG. 2 and passageway 38 again fills with lubricant from passageway 36.

A counting mechanism (not shown here but disclosed in the copending application referred to above) senses the cycles of operation of each motor 18 and actuates the pump 30 associated therewith after a predetermined number of cycles of operation. Thus, at accurately determined intervals, an accurately determined quantity of oil is injected into each line 32 for delivery to a motor 18.

A tubular fitting 48 on each motor 18 is supported within an opening 50 in manifold plate 22. The interior of this fitting defines an inlet 52 through which compressed air enters motor 18. Fitting 48 has openings 54 through which compressed air passes from duct 24 to inlet 52.

A metering screw 56 is threaded into fitting 48. The metering screw has an end portion 58 which is advanced or retracted when the screw is turned to adjust the effective sizes of openings 54 and thereby meter the quantity of compressed air which flows into inlet 52. End portion 58 is illustrated as being tapered but in some applications the end portion is squared off or is provided with other configurations. At its opposite or outer end portion 60, the metering screw is provided with a fitting 62 to which the downstream end of lubricant line 32 connects. Head 62 is illustrated as having a swivel connection with the metering screw to facilitate various angular dispositions thereof as may be convenient for attachment to lubricant line 32. End portion 60 is shown as having a wrench socket 63 to facilitate turning screw 56.

Metering screw 56 has a longitudinal internal passageway 64 having a port 66 at one end for receiving lubricant from line 32. Adjacent tapered end portion 58 of the metering screw, passageway 64 has an outlet port 68. Between ports 66 and 68, passageway 64 is provided with a check valve 70. In the structure illustrated, the check valve comprises a valve member 72 and a spring 74 contained within an enlarged diameter portion 76 of passageway 64 adjacent outlet port 68.

In use, metering screw 56 is turned one way or the other to advance or retract end portion 58 theerof for adjusting the effective sizes of openings 54 and thereby metering the quantity of air which flows through inlet 52 into motor 18. Let it be assumed that the lubricating system for each motor 18 has been primed; that is to say, that passageways 36 and 38, lubricant line 32 and passageway 64 downstream to check ball 74, are filled with lubricant. Whenever it is determined through any suitable automatic means or by observation that a motor 18 requires lubricant, its associated pump 30 is actuated, thereby forcing an accurately determined quantity of lubricant into line 32.

This pressurizes the lubricant in passageway 64 and forces check valve ball 72 to the left as FIG. 4 is viewed against the bias of spring 76 and against any force which may be exerted thereon by the compressed air. The accurately determined quantity of lubricant is forced out of port 68 and injected into the interior of tube 48 at or adjacent inlet 52 at a region of metered air flow to motor 18. When plunger 46 is retracted, pressure in passageway 64 is relieved and check valve 70 closes under the action of spring 76. Upon closing, valve 70 not only contains lubricant within passageway 64 but prevents air under pressure from entering the passageway. When motor 18 requires further lubrication, the process decribed is repeated.

The invention thus provides a simple, inexpensive structure for furnishing both the correct amount of air flow and the correct quantity of lubricant to an air motor or to each of a number of air motors to enable them to operate uniformly over long periods of time in accordance with the individual requirements of each motor.

We claim:
1. In an assembly of an air motor and a duct having a metering element by which a flow of compressed air to said motor is metered, improved means for furnishing lubricant to said motor which comprises:
   a passageway in said metering element adapted to receive and contain lubricant,
   said passageway having an outlet port positioned to admit lubricant from said passageway into the region of metered air flow to said motor,
   and a check valve in said passageway operable in open condition to pass lubricant toward said port and operable in closed condition to contain lubricant in said passageway,
   said metering element being movably mounted with respect to said duct and having an end portion which projects into said duct for adjustably metering said air flow,
   said port being disposed adjacent the downstream end of said end portion,
   said passageway having a portion of enlarged diameter, said check valve comprising a movable member and a spring within said enlarged portion, said spring biasing said valve member toward closed condition,
   said spring being yieldable responsive to lubricant pressure on said member greater than the pressure in said region of metered air flow to facilitate opening movement of said valve member.

2. The structure defined in claim 1 wherein there are a plurality of said motors and said duct comprises a manifold through which air is provided to said motors, a said improved means being provided in associated with each one of said motors.

3. In combination with the structure defined in claim 1, a reservoir for lubricant, a lubricant-transmitting line connected with said passageway, and a pump operable upon actuation to force a predetermined quantity of lubricant from said reservoir into said line under a pressure greater than the air pressure in said region of metered air flow.

4. The structure defined in claim 1 wherein said portion of enlarged diameter is disposed adjacent said port.

5. The structure defined in claim 4 wherein said metering element comprises a screw threadedly mounted adjacent said duct.

References Cited
UNITED STATES PATENTS

| | | | |
|---|---|---|---|
| 2,183,013 | 12/1939 | Davis | 137—605 XR |
| 3,129,788 | 4/1964 | Heckt | 184—55 |
| 3,447,562 | 6/1969 | Hoffman | 184—6 XR |
| 3,454,138 | 7/1969 | Henderson | 184—26 |

FOREIGN PATENTS

| | | |
|---|---|---|
| 879,494 | 6/1953 | Germany. |

MANUEL A. ANTONAKAS, Primary Examiner

U.S. Cl. X.R.
137—605; 184—6